United States Patent
Ishida et al.

(10) Patent No.: US 7,809,281 B2
(45) Date of Patent: Oct. 5, 2010

(54) OPTICAL TRANSMITTER

(75) Inventors: Kazuyuki Ishida, Tokyo (JP); Kaoru Kinjo, Tokyo (JP); Takashi Mizuochi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 1174 days.

(21) Appl. No.: 10/562,147

(22) PCT Filed: Aug. 27, 2003

(86) PCT No.: PCT/JP03/10856

§ 371 (c)(1),
(2), (4) Date: May 19, 2006

(87) PCT Pub. No.: WO2005/025094

PCT Pub. Date: Mar. 17, 2005

(65) Prior Publication Data

US 2006/0245763 A1 Nov. 2, 2006

(51) Int. Cl.
*H04B 10/04* (2006.01)
*H04B 10/12* (2006.01)

(52) U.S. Cl. .................................. 398/188
(58) Field of Classification Search .................. 398/188
See application file for complete search history.

(56) References Cited

U.S. PATENT DOCUMENTS

| 6,384,954 B1 | 5/2002 | Webb | |
| 6,535,316 B1 * | 3/2003 | Mizuhara | 398/183 |
| 6,559,996 B1 * | 5/2003 | Miyamoto et al. | 398/183 |
| 6,850,713 B2 * | 2/2005 | Kikuchi et al. | 398/201 |
| 2003/0156774 A1 * | 8/2003 | Conradi | 385/2 |
| 2003/0198478 A1 * | 10/2003 | Vrazel et al. | 398/183 |

FOREIGN PATENT DOCUMENTS

| EP | 0 701 338 A2 | 3/1996 |
| EP | 0 977 382 A2 | 2/2000 |
| EP | 1 128 580 A2 | 8/2001 |
| JP | 2000-106543 A | 4/2000 |
| JP | 2000-156665 A | 6/2000 |
| JP | 2001-147411 A | 5/2001 |
| JP | 2001-251250 A | 9/2001 |
| JP | 2007-512748 A | 5/2007 |

OTHER PUBLICATIONS

"Principles of Communications", Third Edition by R. E. Ziemer et al., Houghton Mifflin, 1990, pp. 480-482.*
D. Breuer et al, IEEE Photon. Technol. LEtt. vol. 9, No. 3, 1997. pp. 398-400.
R.M. Jopson et al., Tech. Digest of Optical Fiber Comm. Conf. 98, FE1, pp. 406-407, 1998.
B. Zhu et al., Technical Digest of ECOC2002, paper PD. 4.2., Sep. 2002.

* cited by examiner

*Primary Examiner*—Shi K Li
(74) *Attorney, Agent, or Firm*—Birch, Stewart, Kolasch and Birch, LLP

(57) ABSTRACT

A differential encoder generates a differentially encoded signal based on a data signal. An RZ (return to zero) encoder generates an electric RZ differential signal as an RZ signal in an electric area based on the differentially encoded signal. A Mach-Zehnder interferometer type intensity modulator generates an optical RZ-DSPK (differential phase shift keying) signal as an RZ signal in an optical area based on the electric RZ differential signal.

5 Claims, 5 Drawing Sheets

EXAMPLE OF MACH-ZEHNDER INTERFEROMETER
TYPE OPTICAL MODULATOR

OPTICAL TRANSMITTER

TECHNICAL FIELD

The present invention relates to an optical transmitter that is applied to an optical transmission system in which an optical fiber is used for a communication line.

BACKGROUND ART

Long distance optical transmission systems that employ optical relay amplifier transmission systems that use an erbium doped fiber amplifier (EDFA) that can directly amplify light of a 1.5 micrometer band have recently become a main trend. Further, recently, high capacity transmission systems using wavelength-division multiplexing transmission systems are realized by the EDFA that can amplify light in a wide band.

To realize a higher capacity transmission system at a lower cost, increase in a transmission speed per one channel, effective utilization of amplification band (narrowing of wavelength multiplexing interval), and lengthening of relay interval are indispensable.

However, when the transmission speed is increased and/or the relay interval is lengthened, an excessively high optical signal-to-noise ratio is required at the receiving end.

Difference phase shift keying (DPSK) modulation systems that do not have the problem are drawing attention. The difference phase shift keying (DPSK) modulation systems can double the reception sensitivity even at the optical signal-to-noise ratio that is used conventionally.

The DPSK modulation system differentially encodes a phase change between information data series generated from a binary on and off signals, and phase modulates a direct current light. For example, when there is no phase change between data (that is, when a phase change is zero), the DPSK modulation system generates an on signal as a differentially encoded signal. When there is a phase change between pulses (that is, when a phase change is π), the DPSK modulation system generates an off signal as a differentially encoded signal. Particularly, a system that executes a phase modulation of (0, π) based on on and off of the differentially encoded signals using a phase modulator is an NRZ (non-return-to-zero)-DPSK modulation system.

In DPSK modulation system, a transmitting terminal phase modulates a continuous wave (CW) light using a differentially encoded signal obtained by differentially encoding a phase change between information data series generated from the binary on and off signals.

On the other hand, a receiving terminal generates a differentially encoded signal from a DPSK signal, and decodes original data signal from the differentially encoded signal. More specifically, the receiving terminal includes a self delay interference detector that has a one-bit delay interferometer, two photodetectors, and a discriminator, and that extracts a data signal by executing a signal processing called self delay detection.

The self delay interference detector switches over between the two photodetectors depending on a phase of the result of interference determined by the one-bit delay interferometer. Specifically, when the phase difference of a detection signal detected by the one-bit delay interferometer is zero, one of the photodetectors processes the detection signal. When the phase difference is π, the other photodetector processes the detection signal. A signal processed by one of the photodetectors is an inverted output. Both detection signals are input to a latter-stage discriminator, and a data signal is detected. In other words, according to the self delay interference detector, the two photodetectors process detection signals depending on a phase of a result of the interference. Therefore, the self delay interference detector can achieve reception sensitivity two times that of the conventional on/off keying modulation (binary amplitude modulation) system.

As explained above, the DPSK modulation system that can achieve reception sensitivity two times that of the on/off keying modulation system used in the conventional optical transmission system has a possibility of achieving a long distance transmission in high-speed optical communications.

Patent documents 1 and 2 disclose optical transmission apparatuses that transmit a signal by using an RZ (return-to-zero)-DPSK signal which is obtained by intensity modulating the NRZ-DPSK signal into an RZ signal, in addition to the NRZ-DPSK modulation system.

These documents disclose examples of optical transmission apparatuses that use the RZ-DPSK modulation system, and also introduce several papers on the RZ-DPSK modulation system.

For example, the patent document 1 states that the following contents are described in a non-patent literature 1: "It is predicted by simulation that the RZ signal can have a reproduction relay distance expanded by about three times the distance obtained by the NRZ signal at 40 Gbits/s, in a linear relay system in which a 1.3 micrometer zero dispersion fiber transmission path is dispersion compensated for in each relay sector".

The patent document 1 also states that the following contents are described in a non-patent literature 2: "It is indicated by experiments that the RZ signal can have power increased per one channel as compared with power obtained from the NRZ signal, in a 10-Gbits/s 8-wavelength WDM transmission system".

A non-patent literature 3 reports that "A 5200-kilometer long-distance transmission is achieved by using the RZ-DPSK modulation system".

These description contents are considered to be describing the influence of transmission effects using the RZ signal instead of the effects of using the DPSK modulation system. In any case, it is considered preferable to use the RZ signal for transmission in a high-speed optical transmission system.

Patent document 1: Japanese Patent Application Laid-Open No. 2000-106543

Patent document 2: Japanese Patent Application Laid-Open No. 2001-251250

Non-patent literature 1: D. Breuer et al, "Comparison of NRZ and RZ-Modulation Format for 40-Gbit/s TDM Standard-Fiber Systems", IEEE Photon. Technol. Lett. Vol. 9 No. 3 pp. 398-400, 1997.

Non-patent literature 2: R. M. Jopson et al, "Evaluation of return-to-zero modulation for wavelength-division-multiplexed transmission over convention single-mode-fiber" R. M. Jopson et al, in Tech. Digest of Optical Fiber Comm. Conf. '98 FE1, p. 406-407, 1998.

Non-patent literature 3: B. Zhu et al, "Transmission of 3.2 Tb/s (80×42.7 Gb/s) over 5200 km of UltraWave fiber with 100-km dispersion-managed spans using RZ-DPSK format", Technical Digest of ECOC2002, paper PD. 4.2, September 2002.

The optical transmission apparatuses disclosed in the patent and non-patent literatures generate the RZ signal in an optical area. To generate the RZ signal in the optical area means to handle the NRZ signal in an electric area.

On the other hand, in the opposite case, that is, when an RZ electric signal is handled in the electric area, according to the patent document 1, a band required in an electric circuit becomes two times as compared with when an NRZ electric signal is handled in the electric area, and it becomes difficult to increase the transmission speed.

However, generation of the RZ signal in the electric area has advantages in that a circuit scale of the optical transmitter can be reduced and that stability of the apparatus and cost superiority can be achieved.

For example, in the optical transmission apparatus that generates an optical RZ-DPSK signal using an electric NRZ-DPSK signal, the optical phase modulator first phase modulates the electric NRZ-DPSK signal, and an optical intensity modulator intensity modulates the phase modulated signal, thereby generating an optical RZ-DPSK signal, as explained in the patent document 2. In other words, this optical transmission apparatus requires an additional circuit (optical phase modulator, in this example) as compared with when only the optical intensity modulator is used to directly generate the optical RZ-DPSK signal from the electric RZ-DPSK signal.

In the actual manufacturing of the apparatus, it is necessary to carry out various kinds of controls such as a temperature control and a synchronization control in plural circuits and apparatuses having different temperature characteristics and stabilities. When the scale of the apparatus increases, man-hours and costs required to design these controls and to manufacture the apparatus increase.

The patent document 1 also points out the following issues. In the conventional system of directly amplifying the RZ electric signals, when a capacity coupling type driving circuit is used, a variation occurs in a DC level of a driving waveform due to a variation in a mark rate. Therefore, two times of an output dynamic range of the driving circuit is required. A control circuit that compensates for a bias point of the optical intensity modulator that varies due to the mark rate, with the mark rate is also necessary.

However, the issue relates to an RZ-OOK (on-off keying) transmission system before the DPSK transmission system is used. According to the RZ-DPSK transmission system, only a phase change between adjacent data has an information component. Therefore, the variation of the mark rate and the variation of the DC level are not as big a problem as pointed out.

The present invention has been achieved in the light of the problems. It is an object of the invention to provide an optical transmitter that carries out an optical transmission using an optical RZ-DPSK signal, wherein the optical transmitter carries out an optical modulation using an electric RZ-DPSK signal, thereby reducing a circuit scale, providing excellent stability, and reducing cost.

DISCLOSURE OF INVENTION

According to one aspect of the present invention, an optical transmitter includes a differential encoder that generates a differentially encoded signal based on a data signal; an RZ (return to zero) encoder that generates an electric RZ differential signal as an RZ signal in an electric area based on the differentially encoded signal output from the differential encoder; and a Mach-Zehnder interferometer type intensity modulator that generates an optical RZ-DPSK (differential phase shift keying) signal as an RZ signal in an optical area based on the electric RZ differential signal.

In the optical transmitter, the differential encoder generates a differentially encoded signal based on a data signal. The RZ (return to zero) encoder generates an electric RZ differential signal as an RZ signal in the electric area based on the differentially encoded signal. The Mach-Zehnder interferometer type intensity modulator generates an optical RZ-DPSK (differential phase shift keying) signal as the RZ signal in the optical area based on the electric RZ differential signal.

BEST MODE(S) FOR CARRYING OUT THE INVENTION

Exemplary embodiments of an optical transmitter according to the present invention will be explained in detail below, with reference to the accompanying drawings. The present invention is not limited by the embodiments.

Figure 1:
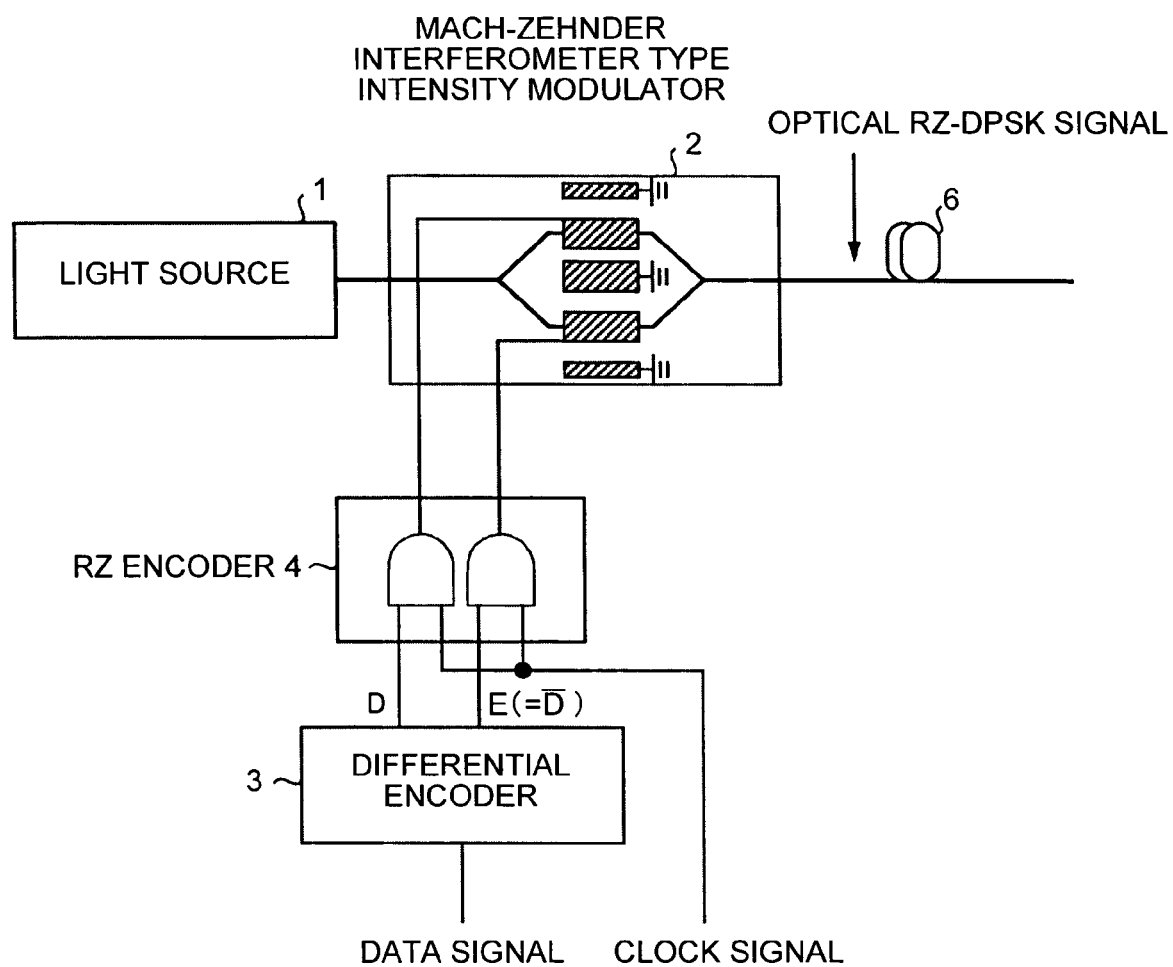
FIG. 1 is a block diagram of an optical transmitter according to an embodiment of the present invention.

FIG. 1 is a block diagram of an optical transmitter according to an embodiment of the present invention. The optical transmitter shown in FIG. 1 includes a light source 1, a Mach-Zehnder interferometer type intensity modulator 2, a differential encoder 3, and an RZ encoder 4. An optical fiber line 6 is connected to the Mach-Zehnder interferometer type intensity modulator 2.

The operation of the optical transmitter according to the present embodiment is explained next. The differential encoder 3 generates two differential signals, a positive phase signal D and a reversed phase signal E (an inverted signal of D)), from input f [Gbits/s] data signal, and outputs the signals to the RZ encoder 4. The RZ encoder 4 includes two AND circuits. One AND circuit receives the positive phase signal D and a clock signal, and other AND circuit receives the reversed phase signal E and the clock signal. The RZ encoder 4 generates RZ differential signals that are obtained by synchronizing the positive phase signal D and the reversed phase signal E with the clock signal. The RZ encoder 4 outputs the RZ differential signals to the Mach-Zehnder interferometer type intensity modulator 2. The Mach-Zehnder interferometer type intensity modulator 2 receives a continuous wave (CW) light from the light source 1, generates an optical RZ-DPSK signal by intensity modulating the continuous wave (CW) light using the RZ differential signal, and outputs the optical RZ-DPSK signal to the optical fiber line 6.

Figure 2:
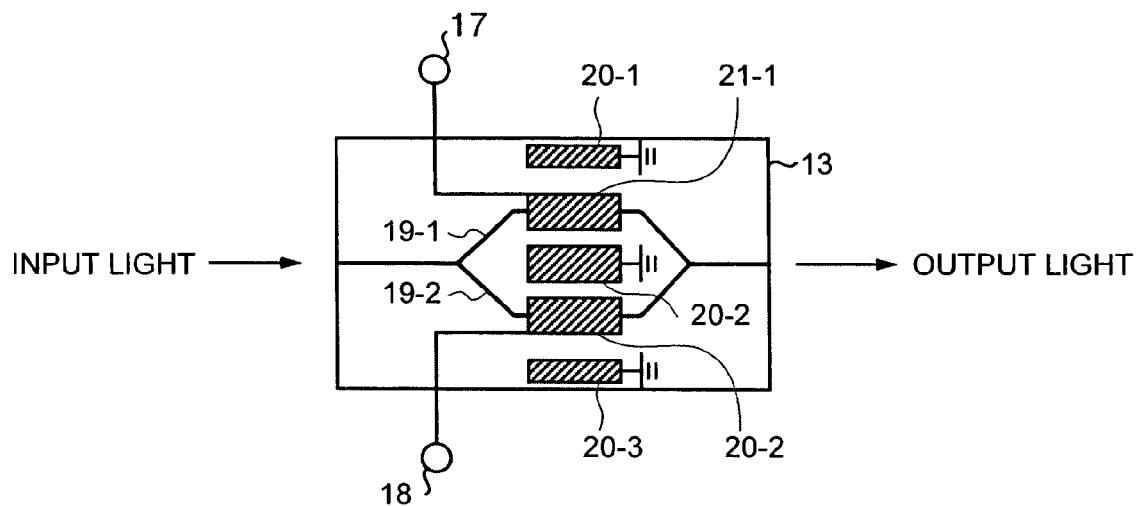
FIG. 2 is a schematic diagram of a Mach-Zehnder interferometer type optical modulator included in the optical transmitter shown in FIG. 1.

FIG. 2 depicts an exemplary configuration of the Mach-Zehnder interferometer type optical modulator 2. The Mach-Zehnder interferometer type optical modulator 2 can have a structure in which optical waveguides 19-1 and 19-2 on two routes and electrodes 20-1 to 20-3, 21-1, and 21-2 are disposed on a LiNbO3 substrate 13. The optical waveguides 19-1 and 19-2 are merged into one optical waveguide at both ends, that is left and right ends in FIG. 2. Light, for example CW light, is input from one end, for example the left end, and a signal, for example the RZ-DPSK signal, is output from other side, for example the right end. The optical electrode 21-1 is connected to a data input terminal, and the electrode 21-2 is connected to an inverted data input terminal 18. The electrodes 20-1 to 20-3 are grounded. The Mach-Zehnder interferometer type optical modulators are usually used optical intensity modulators. However, the Mach-Zehnder interferometer type intensity modulator 2 can independently modulate (control) the phase of each optical path constituting the interferometer as shown in FIG. 2 so that it can be used as an optical intensity modulator that carries out a differential operation. Binary data signals having mutually reversed phases are input to the data input terminal 17 and the inverted data input terminal 18. Inter-peak voltages of those binary data signals are set to a half wavelength voltage of the Mach-Zehnder interferometer type intensity modulator 2.

Figure 3:
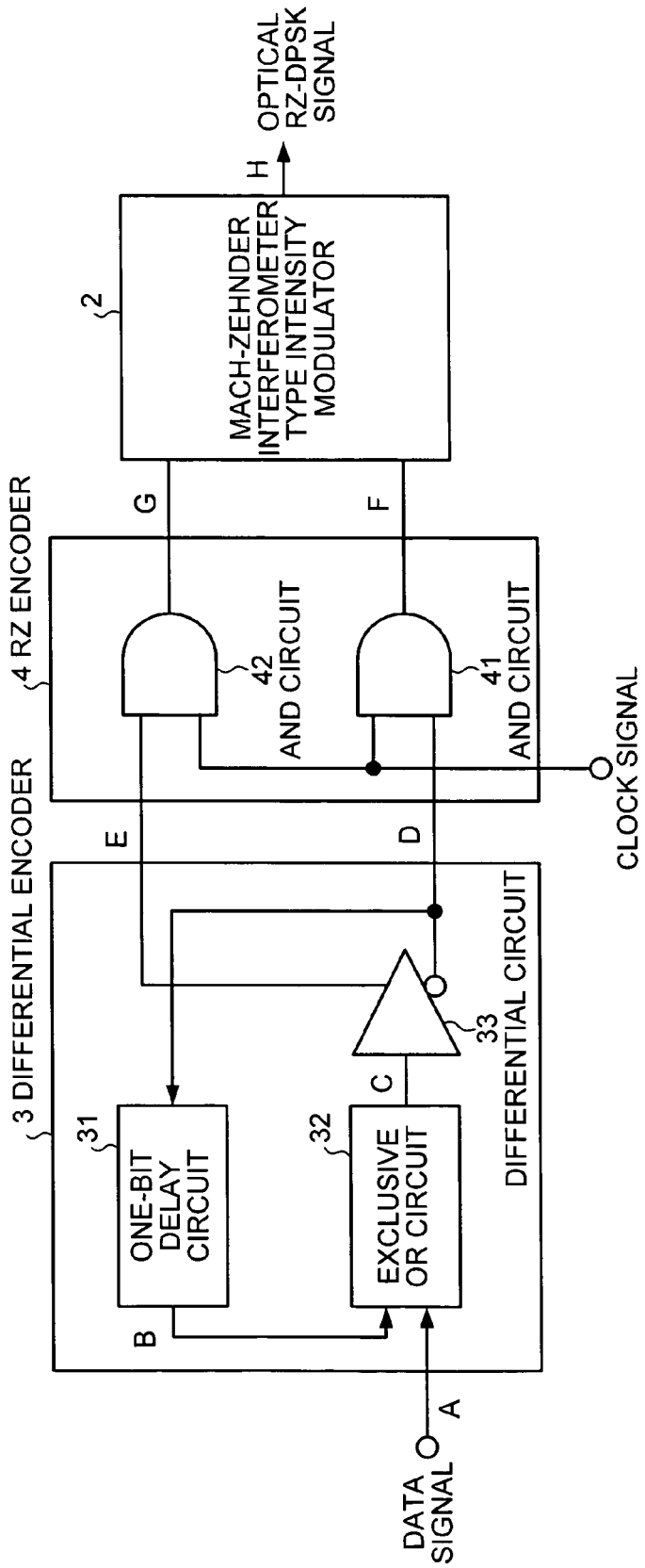
FIG. 3 is a detailed block diagram of a relevant portion of the optical transmitter shown in FIG. 1.
Figure 4:
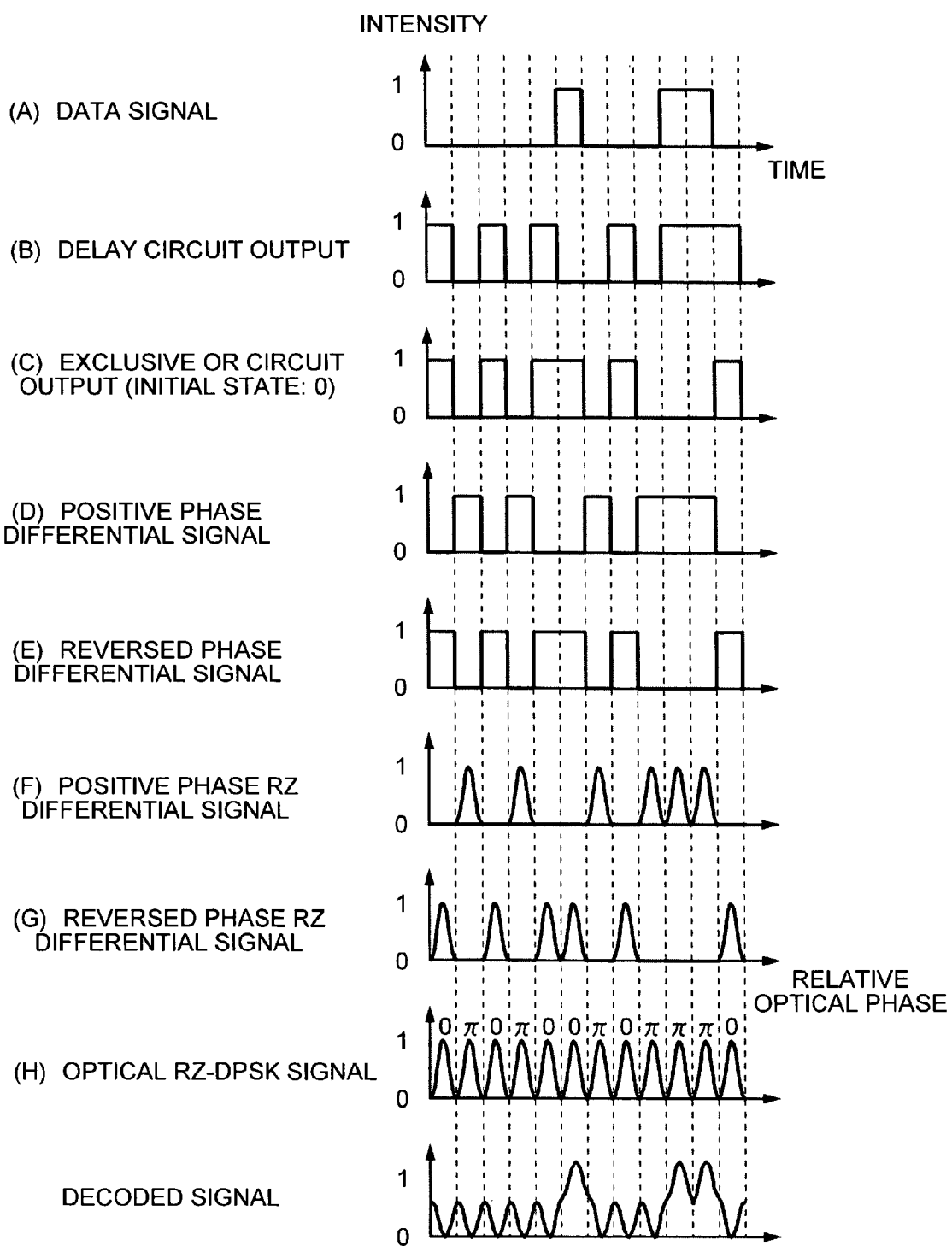
FIG. 4 is a timing chart for explaining modulation-demodulation processing of an RZ-DPSK signal according to the embodiment.

FIG. 3 is a detailed block diagram of a relevant portion of the optical transmitter shown in FIG. 1. FIG. 4 is a timing chart for explaining modulation-demodulation processing of the RZ-DPSK signal according to the present invention. The time charts A to H in FIG. 4 are the time charts at positions indicated by alphabets A to H shown in FIG. 3. The differential encoder 3 includes a one-bit delay circuit 31, an exclusive OR circuit 32, and a differential circuit 33. The RZ encoder 4 includes AND circuits 41 and 42.

How an optical RZ-DPSK signal is generated from a data signal is explained with reference to FIG. 3. A data signal (A) and an output from the one-bit delay circuit (hereinafter, "delay circuit output") (B) are input to the exclusive OR circuit 32. A signal output from the exclusive OR circuit 32 (hereinafter, "exclusive OR circuit output") (C) is input to the differential circuit 33. A positive phase differential signal (D) as an inverted output of the differential circuit 33 is input to the AND circuit 41 of the RZ encoder 4 and to the one-bit delay circuit 31. On the other hand, a reversed phase differential signal (E) as a non-inverted output of the differential circuit 33 is input to the AND circuit 41 of the RZ encoder 4. For the sake of convenience, the inverted output of the differential circuit 33 will be called as a positive phase differential signal, and the non-inverted output will be called as a reversed phase differential signal. These signals can be called differently. However, it is necessary to determine a positive phase and a reversed phase of differential signals to avoid a mutual contradiction in the interpretation of the "1" level or the "0" level in the electric area and in the interpretation of the "1" level or the "0" level in the optical area.

The positive phase differential signal (D) and the reversed phase differential signal (E) that are output from the differential circuit 33 are input to the OR circuits 41 and 42 respectively. In synchronism with the input of the clock signal, the AND circuits 41 and 42 output a positive phase RZ differential signal (F) and a reversed phase RZ differential signal (G) to the Mach-Zehnder interferometer type intensity modulator 2. The Mach-Zehnder interferometer type intensity modulator 2 generates the optical RZ-DPSK signal from the positive phase RZ differential signal (F) and the reversed phase RZ differential signal (G).

A circuit operation for generating the optical RZ-DPSK signal from the data signal is explained with reference to FIG. 4 using states of signals at the positions of the alphabets A to H shown in FIG. 3.

In FIG. 4, the input data signal (A) is a bit string of, for example, "000001000110". On the other hand, when the initial state of the exclusive OR circuit output (C) is zero, a first bit of the one-bit delay circuit output (B) is at the "1" level. In this case, the exclusive OR circuit output (C) is at the "1" level which is the exclusive OR of the data signal (A) and the delay circuit output (B). The positive phase differential signal (D) is at the "0" level which is in the reversed phase of that of the exclusive OR circuit output (C). On the other hand, the reversed phase differential signal (E) is at the "1" level in the same phase as that of the exclusive OR circuit output (C). An output of the positive phase differential signal (D) is input to the one-bit delay circuit 31. Consequently, a bit string shown by (A) to (E) in FIG. 4 is obtained.

The positive phase differential signal (D) and the reversed phase differential signal (E) are input to the AND circuits 41 and 42 respectively, and the positive phase RZ differential signal (F) and the reversed phase RZ differential signal (G) synchronized with the clock signal are generated respectively. An optical RZ-DPSK signal (H) is generated based on the positive phase RZ differential signal (F) and the reversed phase RZ differential signal (G). The optical RZ-DPSK signal (H) becomes a pulse string having continuous optical intensity. The optical RZ-DPSK signal (H) is modulated in a relative phase of zero based on the reversed phase RZ differential signal (G), and the optical RZ-DPSK signal (H) is modulated in a relative phase of π based on the positive phase RZ differential signal (F). In decoding the optical RZ-DPSK signal (H), the original data signal is obtained by intensity modulating a difference of phases between adjacent bits, like a general optical DPSK signal.

Figure 5:
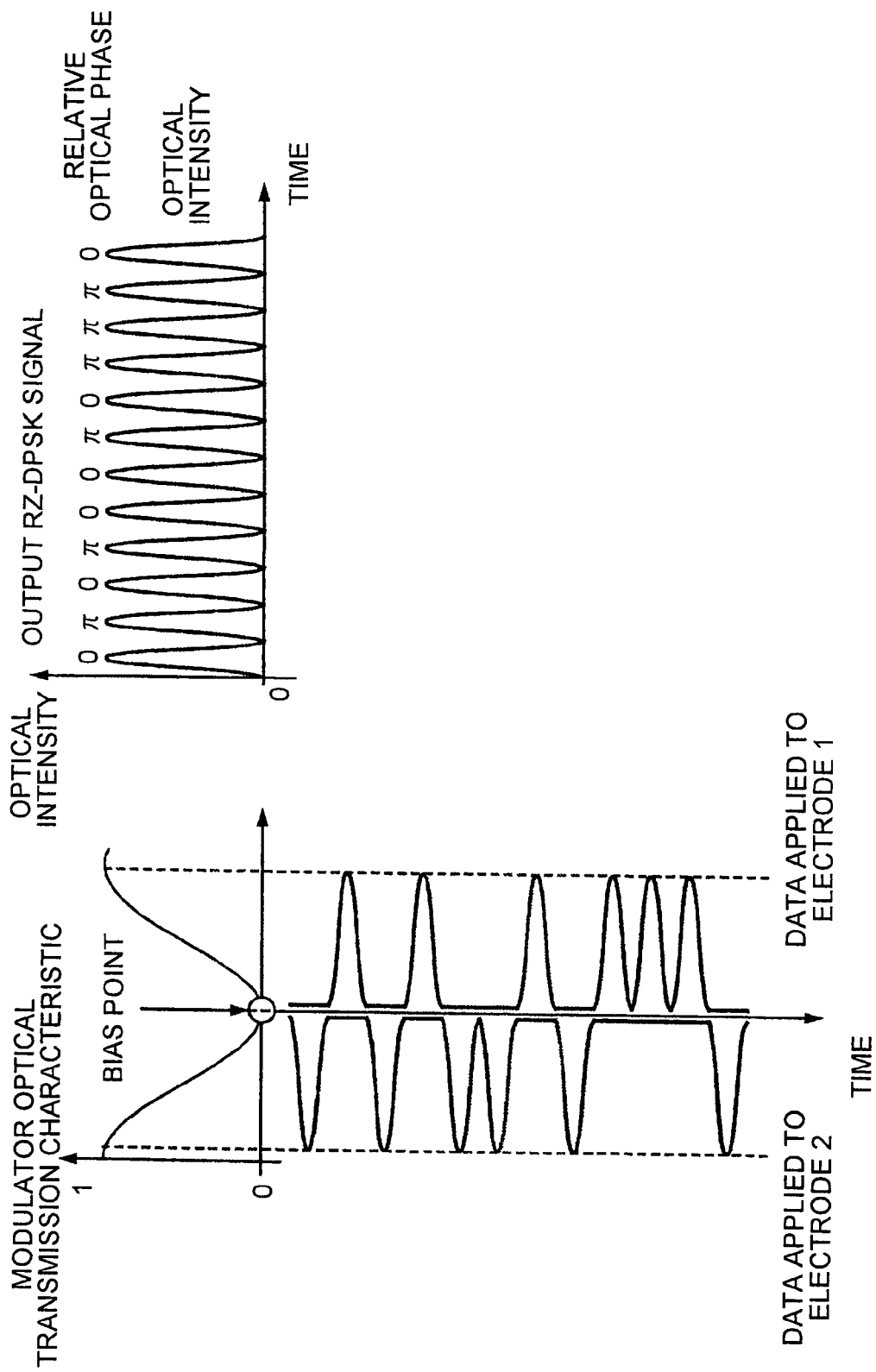
FIG. 5 is a schematic for explaining a process of generation of an optical RZ-DPSK signal from two RZ differential signals.

FIG. 5 is a schematic for explaining a process of generation of the optical RZ-DPSK signal from the RZ differential signals. As shown in FIG. 5, the two RZ differential signals (the positive phase RZ differential signal and the reversed phase RZ differential signal) are applied to two electrodes (an electrode 1 and an electrode 2) using a DC bias point as a bottom (a quenching point) of an optical transmission characteristic of the Mach-Zehnder interferometer type intensity modulator 2 shown in FIG. 1. The optical intensity in the form of a continuous pulse string is obtained. Since a relative phase changes by π with the bottom of the transmission characteristic as a border, the relative phase is modulated by 0/π by applying the two RZ differential signals.

As explained above, according to the optical transmitter of the present embodiment, the differential encoder generates a differentially encoded signal based on a data signal. The RZ (return to zero) encoder generates an electric RZ differential signal as an RZ signal in the electric area based on the differentially encoded signal. The Mach-Zehnder interferometer type intensity modulator generates an optical RZ-DPSK (differential phase shift keying) signal as the RZ signal in the optical area based on the electric RZ differential signal. Therefore, the optical transmitter can be made smaller, stabile, and low-cost.

Moreover, the optical transmitter uses a positive phase differential signal and a reversed phase differential signal that are output from the exclusive OR circuits, the positive phase differential signal being the inverted output of the exclusive OR of the one-bit delayed output from the own apparatus and the data signal, and the reversed phase differential signal being the non-inverted output of the exclusive OR. By using the positive phase differential signal and the reversed phase differential signal, the optical transmitter generates the electric RZ-DPSK signal in the electric area. The optical transmitter also generates the RZ differential signal in the electric area including the two signals of the positive phase RZ differential signal obtained by outputting the positive phase differential signal in synchronism with the clock signal, and the reversed phase RZ differential signal obtained by outputting the reversed phase differential signal in synchronism with the clock signal. Therefore, the optical transmitter can contribute to a reduction in the circuit scale, an increase in the stability of the apparatus, and a reduction in cost.

INDUSTRIAL APPLICABILITY

As described above, the present invention is useful for an optical transmitter that constitutes an optical transmission system that uses an optical fiber for a communication line.

The invention claimed is:

1. An optical transmitter comprising:
a first encoder that generates a differentially encoded signal from a data signal, the differentially encoded signal comprising a positive phase differential signal and a reverse phase differential signal, the reverse phase differential signal being an inverted version of the positive phase differential signal, the first encoder including a one-bit delay circuit, an exclusive OR circuit, and a differential circuit that is electrically connected to the exclusive OR circuit and outputs an inverted output signal and a non-inverted output signal, wherein the first encoder is configured so that an output signal of the exclusive OR circuit is input to the differential circuit, the inverted output signal of the differential circuit is input to the one-bit delay circuit, and an output signal of the one-bit delay circuit and the data signal is input to the exclusive OR circuit, the inverted output signal of the differential circuit being the positive phase differential signal, and the non-inverted output signal of the differential circuit being the reverse phase differential signal;
a second encoder to which a clock signal and the positive phase and the reverse phase differential signals are input, the second encoder being configured to generate an electric RZ (return-to-zero) differential signal as an RZ signal in an electric area from the differentially encoded signal, the electric RZ differential signal comprising a positive phase RZ signal and reverse phase RZ signal which are generated by the second encoder by synchronizing the positive phase and the reverse phase differential signals with the clock signal; and
a Mach-Zehnder interferometer type intensity modulator that generates an optical RZ-DPSK (differential phase shift keying) signal as an RZ signal in an optical area based on the electric RZ differential signal.

2. The optical transmitter according to claim 1, wherein the optical RZ-DPSK signal is modulated by a differential phase of (0, π).

3. A method for optical transmission, comprising:
generating a differentially encoded signal from a data signal using an encoder including a one-bit delay circuit, an exclusive OR circuit, and a differential circuit that is electrically connected to the exclusive OR circuit and outputs an inverted output signal and a non-inverted output signal, by inputting an output signal of the exclusive OR circuit to the differential circuit, inputting the inverted output signal to the one-bit delay circuit, and inputting an output signal of the one-bit delay circuit and the data signal to the exclusive OR circuit, the differentially encoded signal comprising a positive phase differential signal and a reverse phase differential signal, the reverse phase differential signal being an inverted version of the positive phase differential signal;
generating an electric RZ (return-to-zero) differential signal as an RZ signal in an electric area from the differentially encoded signal, the electric RZ differential signal comprising a positive phase RZ signal and a reverse phase RZ signal which are generated by synchronizing the positive phase differential signal and the reverse phase differential signal, respectively, with a clock signal;
inputting the electric RZ differential signal to a Mach-Zehnder interferometer type intensity modulator;
utilizing the Mach-Zehnder interferometer type intensity modulator to modulate the output of a light source based on the electric RZ differential signal to generate an optical RZ-DPSK (differential phase shift keying) signal as an RZ signal in an optical area; and
transmitting the RZ-DPSK signal via an optical transmission line.

4. The method according to claim 3, wherein the optical RZ-DPSK signal is modulated by a differential phase of (0, π).

5. The method according to claim 3, wherein
the positive phase differential signal is generated by inverting an output of a circuit which performs an exclusive OR of the data signal and a one-bit delayed version of the inverted output of the circuit, and
the reversed phase differential signal is obtained as a non-inverted output of the circuit performing the exclusive OR.

* * * * *